3,470,253
PROCESS FOR THE PREPARATION OF DIALKALI METAL SALTS OF DINITROCYCLIC KETONES
Henry Feuer, West Lafayette, Ind., and Albert M. Hall, Durham, N.C., assignors to Purdue Research Foundation, Lafayette, Ind., a corporation of Indiana
No Drawing. Filed Dec. 27, 1967, Ser. No. 693,738
Int. Cl. C07c 79/36
U.S. Cl. 260—586                             8 Claims

ABSTRACT OF THE DISCLOSURE

A process for preparing dialkali metal salts of a,a'-dinitrocyclic ketones by reacting a cyclic ketone and an alkyl nitrate in the presence of a solution of alkali metal amide, such as potassium amide, in liquid ammonia.

BRIEF SUMMARY OF THE INVENTION

This invention relates to a process for the preparation of dialkali metal salts of a,a'-dinitrocyclic ketones. In a particular aspect, this invention relates to a process for the preparation of dialkali metal salts of a,a'-dinitrocyclic ketones by reaction of a cyclic ketone with an alkyl nitrate in the presence of a solution of an alkali metal amide in liquid ammonia.

It has long been known that potassium salts of a,a'-dinitrocyclic ketones are prepared in yields on the order of approximately 6% by reaction of a cyclic ketone and ethyl nitrate in the presence of alcoholic potassium ethoxide. More recently the dipotassium salts of a,a'dinitrocyclic ketones have been prepared by reacting a cyclic ketone with an alkyl nitrate in the presence of a potassium-alkoxide and tetrahydrofuran as a solvent with yields reportedly in the range of from about 30 to about 75%. In spite of these relatively high yields, certain drawbacks have restricted the use of the latter procedure. A primary restriction is that the potassium alkoxide-tetrahydrofuran reaction medium is difficult and expensive to prepare.

It is an object of the present invention to provide a process for the preparation of dialkali metal salts of a,a'-dinitrocyclic ketones.

It is a further object of the present invention to provide a process for the preparation of dialkali metal salts of a,a'-dinitrocyclic ketones using a relatively inexpensive, easily prepared reaction medium.

Other objcets and advantages of the present invention will be apparent from the specification and appended claims.

It has been discovered in accordance with the present invention that dialkali metal salts of a,a'-dinitrocyclic ketones are obtained by reacting a cyclic ketone with an alkyl nitrate in the presence of a solution of an alkali metal amine in liquid ammonia.

DETAILED DESCRIPTION

In carrying out the process of the present invention, the cyclic ketone and alkyl nitrate are contacted under reaction conditions in the presence of a solution of alkali metal amide in liquid ammonia for a period of time sufficient to form the dialkali metal salt of a,a'-dinitrocyclic ketone. Typically, formation of said ketone is effected in from about 0.5 to about 24 hours.

The process of the present invention is carried outunder conditions of temperature and pressure wherein the ammonia is in the liquid state. A temperature in the range of from about —33 to about —60° C. is typically employed with a temperature above —50° being preferred. It is an advantage of the present invention that it may be conducted at atmospheric pressure, although if desired subatmospheric or superatmospheric pressures may be employed.

The molar ratio of alkyl nitrate to cyclic ketone may be varied over a wide range, with a ratio of alkyl nitrate to ketone of at least 2.0:1.0 being preferred. A molar ratio of alkyl nitrate to ketone in the range of from about 2.1:1 to about 2.5:1 is especially preferred.

The molar ratio of alkali metal amide to cyclic ketone may also be varied over a wide range with a ratio of alkali metal amide to cyclic ketone of at least 2.0 to 1.0 being preferred. A molar ratio of alkali metal amide to ketone in the range of about 2.1:1 to about 2.5:1 is especially preferred. It is also preferred, in order to limit unnecessary destruction of alkyl nitrate by the alkali metal amide, to avoid a molar ratio of alkali metal amide to alkyl nitrate in excess of 1:1.

The solution of alkali metal amide in liquid ammonia may be prepared by any suitable procedure. One such procedure involves reacting a suitable alkali metal with a quantitative excess of liquid ammonia. The reaction is carried out simply by mixing the alkali metal with liquid ammonia. Any suitable alkali metal, as for example, lithium, potassium, sodium and cesium, may be employed. Because of the excellent results obtained therewith, potassium amide is preferred in the present invention.

The alkyl nitrate employed in the present invention should be a primary alkyl nitrate, that is to say, an alkyl nitrate wherein the nitrate group is attached to a carbon atom bonded to at least two hydrogen atoms. Typically suitable alkyl nitrates are represented by the formula $RONO_2$, wherein R is an alkyl radical containing from 1 up to about 25 carbon atoms. It is preferred to use alkyl nitrates containing from about 2 to about 10 carbon atoms because they are readily available and give good results in the process. Examples of such alkyl nitrates include amyl nitrate, ethyl nitrate, propyl nitrate, butyl nitrate, octyl nitrate, etc., and the like. While the methyl nitrate is operative in the process, its use is preferably avoided because of its relative instability.

The cyclic ketones employed in the process of the present invention are of the formula

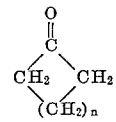

wherein $n$ is an integer typically in the range of from about 1 to about 20 and preferably of from about 2 to about 10. Examples of such ketones include cyclohexanone, cyclopentanone, cyclooctanone, cycloheptanone, cyclobutanone, and the like.

As previously indicated, the process of the present invention is carried out by contacting a cyclic ketone and an alkyl nitrate under reaction conditions in the presence of a solution of alkali metal amide in liquid ammonia. It is preferred to first add the cyclic ketone to the solution of alkali metal amide in liquid ammonia before adding the alkyl nitrate. It is believed that in so adding the reactants, decomposition of the alkyl nitrate due to prolonged contact with the alkali metal amide is minimized.

The dialkali metal salts of a,a'-dinitrocyclic ketones prepared in accordance with the process of the present invention may be recovered by any suitable procedure. One such procedure involves adding anhydrous ether to the reaction medium to stop the reaction, removing ammonia from the reaction medium, as by evaporation, filtering and drying the reaction product. The dried reaction product may then be further purified by dissolving it in water, adding an equal volume of methanol to the thus formed solution, precipitating the dialkali metal salts of a,a'-dinitrocyclic ketone from the solution with acetone.

The dialkali metal salts of dinitrocyclic ketones are readily converted to a,a',w,w'-tetrabromo-a,a'-dinitroparaffins by reaction with an alkali metal hypobromite, such as potassium hypobromite, in the known manner. Because the dialkali metal salts of a,a'-dinitrocyclic ketones are hygroscopic, their yields are more easily determined in terms of the yield of the corresponding bromo compound.

The dialkali metal salts of a,a'-dinitrocyclic ketones are useful as insecticides and fungicides.

The invention will be understood more fully by reference to the following specific examples. It is understood that the examples are presented for the purpose of illustration only and are not intended as a limitation of the invention.

Example 1

A solution of 0.14 mole of potassium amide in 200 ml. of liquid ammonia was provided in a reaction vessel equipped with stirrer, thermometer and cooling means. The solution had a temperature of −33° C. To the said solution was added 0.07 mole of cyclohexanone, dropwise, over 15 minutes with stirring. When the addition of cyclohexanone was completed, stirring was continued for two hours. Following the two-hour period, 0.154 mole of amyl nitrate was added, dropwise, over ten minutes. Upon completion of the addition of amyl nitrate, the resulting mixture was stirred for 30 minutes to obtain a reaction mixture containing the dipotassium salt of a,a'-dinitrocyclohexanone. Throughout the reaction procedure, the temperature was maintained at approximately −33° C. Following the 30-minute period, 100 ml. of anhydrous ether were added to the reaction mixture, and the reaction mixture was allowed to warm above −33° C. to permit evaporation of ammonia. The resulting dipotassium salt of a,a'-dinitrocyclohexanone containing product was then filtered and dried under vacuum to obtain 18.545 grams of crude dipotassium a,a'-dinitrocyclohexanone.

7.545 grams of the crude material were dissolved in water. To the resulting solution was added an equal volume of methanol, followed by the addition of an equal volume of acetone. The resulting material was filtered and dried in vacuo. 5.72 grams of dipotassium a,a'-dinitrocyclohexanone were obtained.

2.262 grams of the crude material were dissolved in water. The thus formed solution was then added to an aqueous solution of potassium hypobromite to effect the crystallization of 1,1,5,5-tetrabromo-1,5-dinitropentane. The crystalline product was separated from the aqueous medium by filtration and recrystallized from hexane. 2.45 grams of 1,1,5,5-tetrabromo-1,5-dinitropentane were obtained.

Examples 2–4

Additional examples of the preparation of dialkali metal salts of a,a'-dinitrocyclic ketones are given in the following table. The said cyclic ketones were prepared and converted to the corresponding tetrabromo compound following the general procedure utilized in Example 1.

TABLE 1

| Example No. | Product | Ketone | Yield, based on ketone, percent |
|---|---|---|---|
| 2 | Dipotassium dinitrocyclopentanone. | Cyclopentanone | 88.8 |
| 3 | Dipotassium dinitrocycloheptanone. | Cycloheptanone | 52.8 |
| 4 | Dipotassium dinitrocyclooctanone. | Cyclooctanone | 25.3 |

Example 5

Essentially the same procedure used in Example 1 is employed except that sodium amide is substituted for potassium amide and propyl nitrate is substituted for amyl nitrate to make disodium dinitrocyclohexanone.

Example 6

Essentially the same procedure used in Example 1 is employed except that lithium amide is substituted for potassium amide and butyl nitrate is substituted for amyl nitrate to make dilithium dinitrocyclohexanone.

Example 7

Essentially the same procedure used in Example 1 is employed except that cesium amide is substituted for potassium amide to make dicesium dinitrocyclohexanone.

Since many embodiments of this invention may be made and since many changes may be made in the embodiments described, the foregoing is to be interpreted as illustrative only and the invention is defined by the claims appended hereto.

We claim:

1. A process for the preparation of dialkali metal salt of a,a'-dinitrocyclic ketone which comprises reacting a cyclic ketone of the formula $$\underset{(CH_2)_n}{H_2C\overset{\overset{O}{\|}}{\diagup}CH_2}$$

wherein $n$ is an integer of from 1 up to about 20 with a primary alkyl nitrate in the presence of a solution of alkali metal amide in liquid ammonia at a temperature from about −33 to about −60° C.

2. The process of claim 1 wherein the alkyl nitrate is a primary alkyl nitrate of the formula $RONO_2$ wherein R is an alkyl radical having from about 2 to about 20 carbon atoms.

3. The process of claim 1 wherein the alkali metal amide is potassium amide.

4. The process of claim 1 wherein the molar ratio of alkyl nitrate to cyclic ketone is at least 2.0:1.0.

5. The process of claim 4 wherein the molar ratio of alkyl nitrate to cyclic ketone is in the range of from about 2.1:1.0 to about 2.5:1.0.

6. The process of claim 1 wherein the molar ratio of alkali metal amide to cyclic ketone is at least 2.0:1.0.

7. The process of claim 6 wherein the molar ratio of alkali metal amide to cyclic ketone is in the range of from about 2.1:1.0 to about 2.5:1.0.

8. The process of claim 1 wherein the reaction is conducted at a temperature in the range of from about −33° C. to about −50° C.

References Cited

UNITED STATES PATENTS 3,100,805 __ 8/1963 Bay _____ 260—644

OTHER REFERENCES

Feuer: "J. Am. Chem. Soc." vol. 78, pp. 4366 and 4367, (1956) 2D1.A5.

LEON ZITVER, Primary Examiner

MATTHEW M. JACOB, Assistant Examiner

U.S. Cl. X.R.

260—644

PO-1050
(5/69)

UNITED STATES PATENT OFFICE
CERTIFICATE OF CORRECTION

Patent No. 3,470,253      Dated September 30, 1969

Inventor(s) Henry Feuer et al

It is certified that error appears in the above-identified patent and that said Letters Patent are hereby corrected as shown below:

> In column 1, line 48, delete "objcets" and substitute therefor --objects--; in
>
> line 55, delete "amine" and substitute therefore --amide--; in
>
> line 65, delete "outunder" and substitute therefor --out under--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents